United States Patent [19]
Grover et al.

[11] Patent Number: 5,129,611
[45] Date of Patent: Jul. 14, 1992

[54] CART WITH LOWERABLE TOP WALL

[75] Inventors: Rodney D. Grover, Alma, Mich.; Bernard J. Laichalk, Sarasota, Fla.

[73] Assignee: Inverness Industries, Inc., Alma, Mich.

[21] Appl. No.: 674,091

[22] Filed: Mar. 25, 1991

[51] Int. Cl.⁵ .............................................. F16M 3/00
[52] U.S. Cl. ................................... 248/688; 108/147; 248/157; 248/676; 312/312
[58] Field of Search ............... 248/688, 676, 132, 161, 248/157, 244, 274, 295.1; 108/91, 147; 211/1.5, 107; 312/312

[56] References Cited

U.S. PATENT DOCUMENTS

| | | |
|---|---|---|
| 396,741 | 1/1889 | Healey . |
| 526,144 | 9/1894 | Carver . |
| 1,893,551 | 1/1933 | Kask . |
| 2,938,632 | 5/1960 | Mondineu . |
| 3,215,483 | 11/1965 | Nelson ........................ 312/312 X |
| 3,361,510 | 1/1968 | McDermott .................. 108/147 X |
| 3,415,586 | 12/1968 | Hammond .................... 108/147 X |
| 3,454,317 | 7/1969 | Salkind . |
| 3,761,152 | 9/1973 | Cory .............................. 312/312 X |
| 3,765,343 | 10/1973 | Ettlinger, Jr. et al. . |
| 4,302,023 | 11/1981 | Kiesz . |
| 4,912,359 | 3/1990 | Offutt et al. ................... 108/147 X |
| 4,981,085 | 1/1991 | Watt ................................... 108/147 |

Primary Examiner—Ramon O. Ramirez
Attorney, Agent, or Firm—Barnes, Kisselle, Raisch, Choate, Whittemore & Hulbert

[57] ABSTRACT

A display stand which is capable of being raised or lowered having an intermediate frame telescoped in a base frame for vertical sliding movement and a upper frame telescoped in the intermediate frame for vertical sliding movement. Power mechanism including a motor and cables is provided for raising and lowering the intermediate frame relative to the base frame and for raising and lowering the upper frame in response to such raising and lowering of the intermediate frame. The upper frame has a table top for supporting a display terminal, television set or the like, in the raised position of the display stand, and a lower shelf for supporting the display terminal, television set or the like, in the lowered position of the display stand.

8 Claims, 3 Drawing Sheets

CART WITH LOWERABLE TOP WALL

This invention relates generally to display stands and refers more particularly to a display stand which is capable of being raised and lowered.

BACKGROUND AND SUMMARY

Display stands, especially those used in classrooms for student instruction, must be capable of supporting video displays and the like in a sufficiently elevated position for all to see. However, a display stand which is high enough for classroom use is usually too high to be moved about conveniently and safely. It is a primary object of this invention to provide a display stand which is capable of being raised during times of use and lowered at other times when stored or when moved from place to place.

In accordance with this invention, the display stand has an intermediate frame mounted on a base frame for vertical sliding movement, and an upper frame mounted on the intermediate frame to vertical sliding movement, means on the upper frame for supporting a display terminal, television set or the like, means for raising and lowering the intermediate frame relative to the base frame, and means for raising the upper frame relative to the intermediate frame.

Another object is to provide a display stand which is dependable in operation, rugged, composed of a relatively few simple parts, and capable of being readily manufactured and assembled.

Other objects, features and advantages of the invention will become apparent as the following description proceeds, especially when considered with the accompanying drawings.

DETAILED DESCRIPTION

Figure 1:
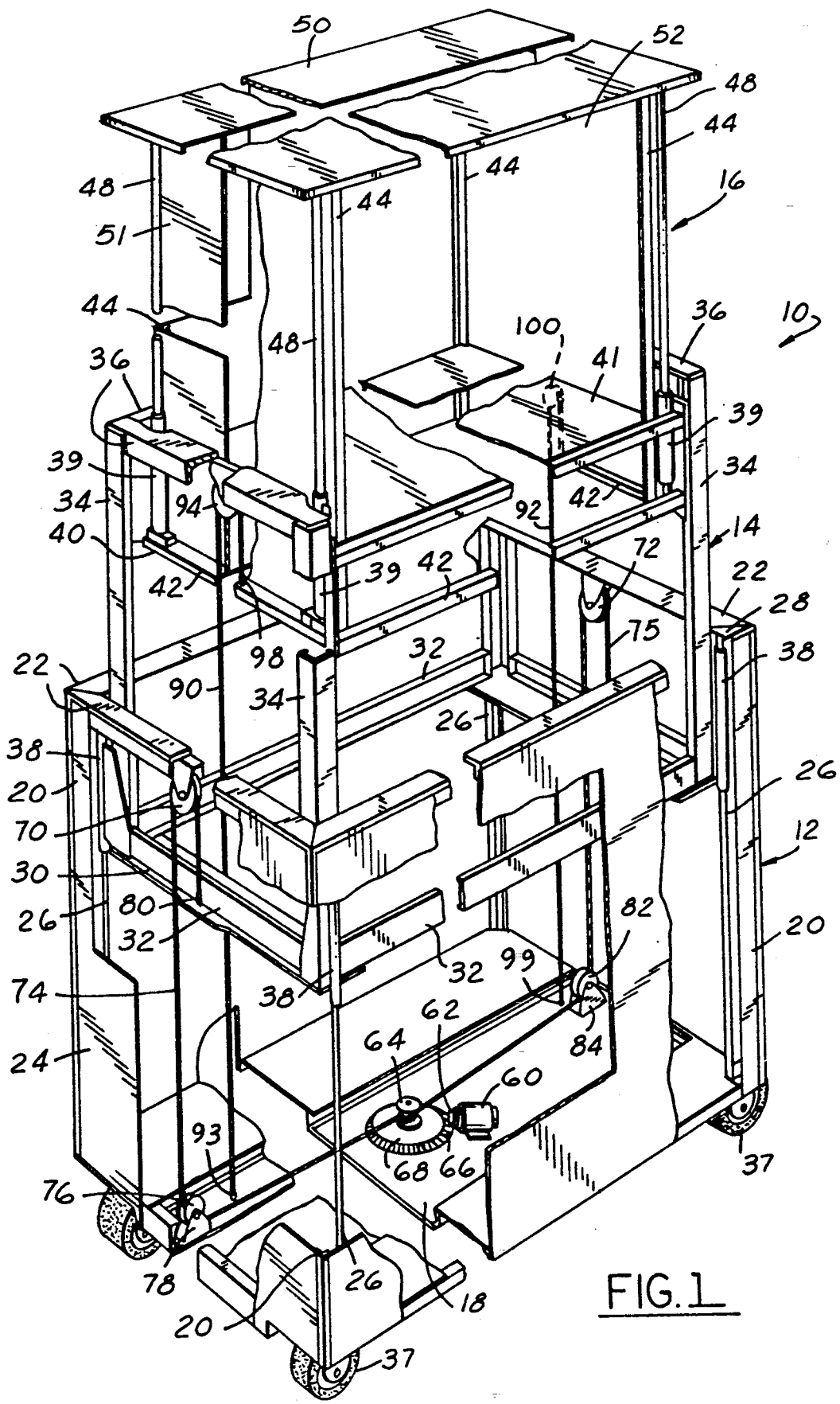
FIG. 1 is a perspective view with parts broken away of a display stand constructed in accordance with the invention.

Referring now more particularly to the drawings, the display stand there illustrated is generally designed 10 and has a base frame 12, an intermediate frame 14 and an upper frame 16.

The base frame 12 has a horizontal rectangular bottom plate 18, four vertical corner posts 20 arranged in a rectangular pattern and rigidly secured to and extending upwardly from the four corners of the base plate 18, and four horizontal bars 22 rigidly connected end to end and also rigidly connected at their ends to the tops of the posts. The horizontal bars 22 define a rectangular opening for the top of the base frame 12 to receive the intermediate frame 14. Paneling 24 may be provided for the four sides of the base frame. Inwardly of each corner post 20 there is a vertical slide bar 26 rigidly secured at the bottom to the base plate 18 and at the top to a suitable bracket 28 connected to one or both of the horizontal bars 22 at each corner of the base frame.

The intermediate frame 14 is telescoped within the base frame and has a base 30 composed of four lower horizontal bars 32 connected together end-to-end in a horizontal, rectangular pattern. Four vertical corner posts 34 arranged in a rectangular pattern are rigidly secured to and extend upwardly from the four corners of the base 30 where the horizontal bars 32 of the base are connected to one another. Four upper horizontal bars 36 are rigidly connected end-to-end and are also rigidly connected at their ends to the tops of the posts 34. The upper horizontal bars 36 define a rectangular opening for the top of the intermediate frame 14 to receive the upper frame 16. Sleeves 38 are rigidly secured to the respective posts 34 near the base 30 and slidably receive the slide bars 26 of the base frame 12, enabling the intermediate frame 14 to slide vertically between the lower position shown in FIGS. 2 and 3 to the upper position shown in FIGS. 1, 5 and 6. Paneling may be provided for the four sides of the intermediate frame. Four sleeves 39 are rigidly secured to the respective posts 34 near their upper ends. Caster wheels 37 on the bottom of the base 18 support the display stand for movement on the floor or other supporting surface.

The upper frame 16 is telescoped within the intermediate frame and has a base 40 composed of four lower horizontal bars 42 connected together end-to-end in a rectangular pattern. Four vertical corner posts 44 arranged in a rectangular pattern are rigidly secured to and extend upwardly from the four corners of the base 40 where the horizontal bars 42 of the base are connected to one another. A horizontal, rectangular shelf 41 is secured to the posts 44 above bars 42. Adjacent each corner post 44 there is a vertical slide bar 48 rigidly secured at the lower end to the base 40 and at the upper end to a horizontal, rectangular table top 50 secured to the upper ends of the posts 44. The slide bars 48 slide in the sleeves 39 of the intermediate frame 14. Paneling 51 may be provided for three of the sides of the top frame, but the front side 52 is open.

Figure 3:
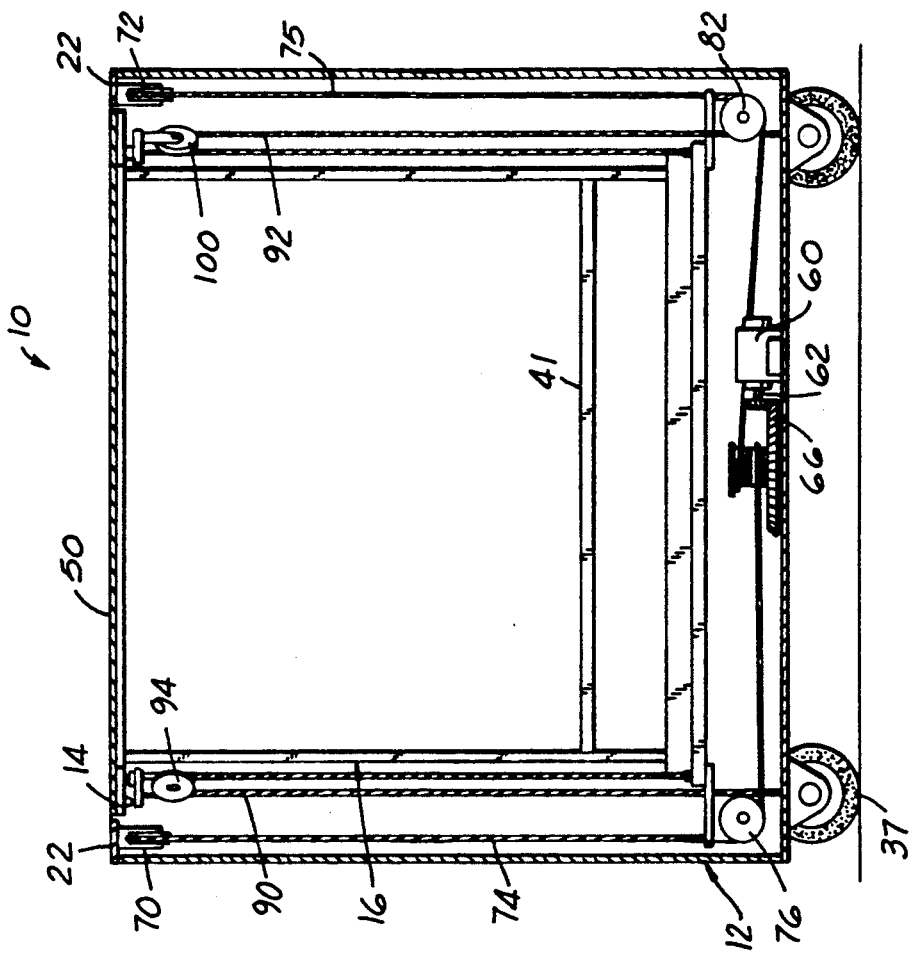
FIG. 3 is a front view with parts broken away and in section.
Figure 2:
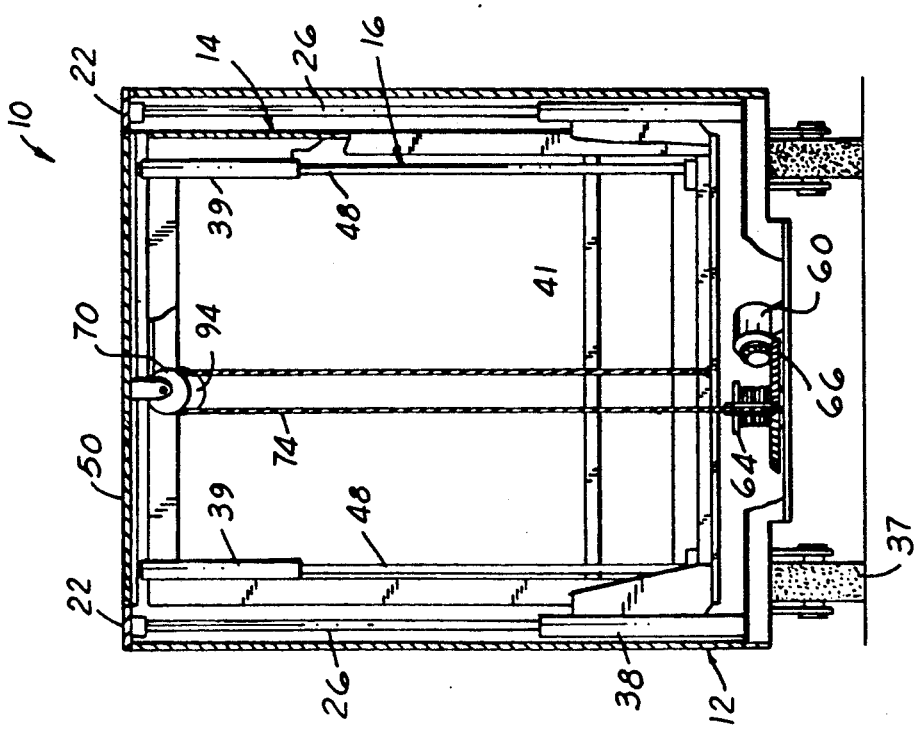
FIG. 2 is an end view with parts broken away and in section of the display stand shown in FIG. 1.
Figure 4:
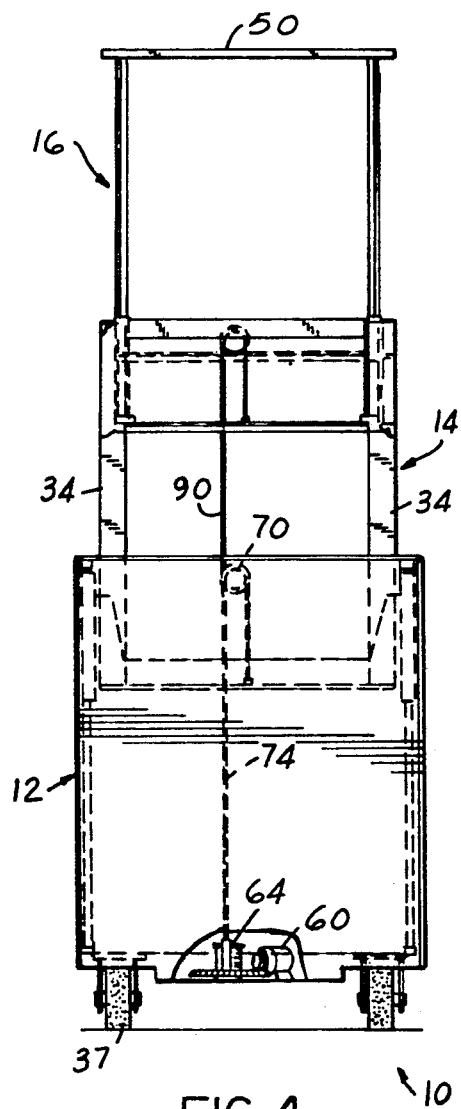
FIGS. 4 and 5 are similar to FIGS. 2 and 3, respectively, but show the display stand in the raised position.
Figure 5:
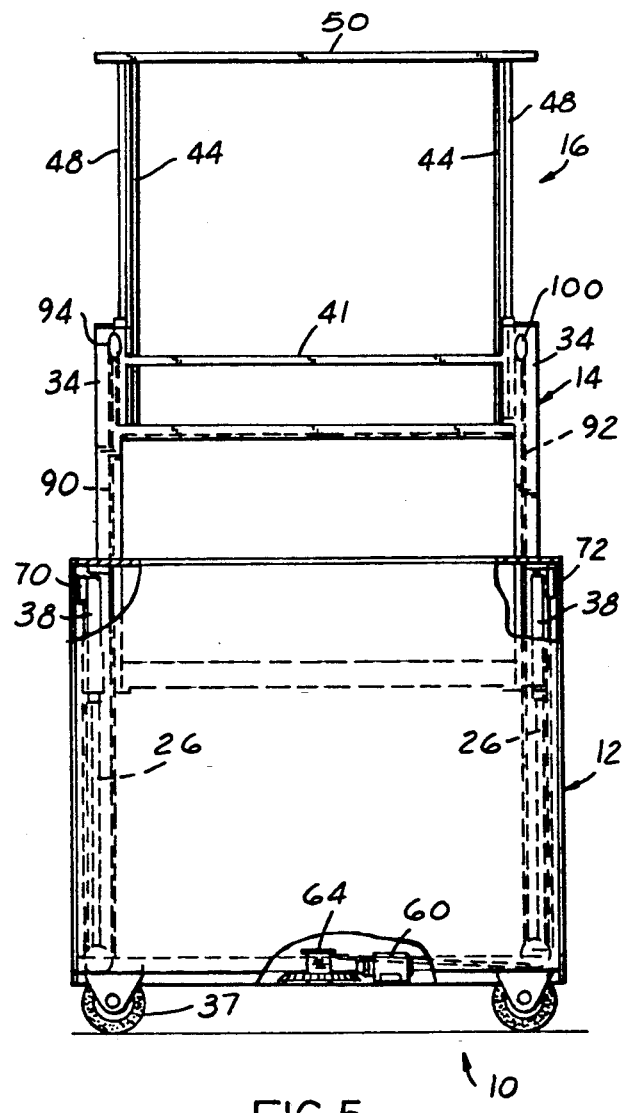

The frames 14 and 16 of the display stand can be raised to the position shown in FIGS. 1, 4 and 5 and lowered to the position shown in FIGS. 2 and 3. In the lower position of FIGS. 2 and 3, the upper frame bars 36 of the intermediate frame 14 nest within the upper frame bars 22 of the base frame 12, and the rectangular table top 50 of the upper frame 16 nests within the upper frame bars 36 of the intermediate frame 14, all in a horizontal plane.

A motor 60 mounted on the bottom plate 18 of the base frame 12 supplies the power for raising the display stand. The motor output shaft 62 drives a vertical reel 64 rotatably mounted on the bottom plate 18, by gearing 66 between the motor output shaft and a disk 68 on the reel 64. A pair of sheaves 70 and 72 are mounted on two opposed upper frame bars 22 of the base frame. A pair of flexible linear members in the form of cables 74 and 75 are wrapped around the reel 64. Cable 74 extends from the reel 64 under a sheave 76 mounted on a bracket 78 secured to the bottom plate 18 of the base frame 12, over the sheave 70 and then downward to the point where its end is anchored to the base 30 of intermediate frame 14 as indicated at 80. The other cable 75 extends from the reel 64 under a sheave 82 carried by a bracket 84 mounted on the bottom plate 18, over the sheave 72 and then downward to the point where its end is anchored to the base 30 of intermediate frame 14. When the motor 60 is driven in one direction, the cables are taken in, raising the intermediate frame 14 to the upper position shown in FIGS. 1, 4 and 5. Operation of the motor in the opposite direction allows intermediate frame 14 to descend by gravity to its lower position shown in FIGS. 2 and 3.

The upper frame 16 is raised in response to the raising of the inner intermediate frame 14 by means including the cables 90 and 92. Cable 90 has one end anchored at 93 to the bottom plate 18 adjacent one side of the base frame 12. This cable extends upwardly and over a sheave 94 carried by a bracket secured to the upper frame bar 36 at one side of the intermediate frame 14, and then downward to a point where it is anchored at 98 to the frame bar 42 of the upper frame 16. The other cable 92 is anchored at 99 to the bottom plate 18 at the opposite side of the base frame and in spaced relation to the anchorage for cable 90. Cable 92 extends up and over a sheave 100 carried by a bracket mounted on the upper frame bar 36 at the opposite side of the intermediate frame and then downward to the point where its opposite end is anchored to a frame bar 42 of the upper frame 16.

It will be clear that when the intermediate frame is raised by motor 60 to its upper position shown in FIGS. 1, 4 and 5, the upper frame, in response to such upward movement of the intermediate frame, will be raised to its upper position shown in these same Figures. Likewise, when the motor 60 is driven in the opposite direction to permit the intermediate frame to descend by gravity to the lowermost position shown in FIGS. 2 and 3, the upper frame, in response to such lowering of the intermediate frame, will also descend by gravity to its lowermost position shown in FIGS. 2 and 3.

The display stand when not being used, or when being moved from place to place, will usually be in the collapsed position shown in FIGS. 2 and 3 with the upper frame 16 fully nested within the intermediate frame 14 and the intermediate frame 14 fully nested within the base frame 12. In this position, a display terminal, television set or the like, may be supported within the upper frame on the shelf 41. To use the display stand for display purposes, the display stand is raised to the position of FIGS. 1, 4 and 5, and the display terminal or the like is removed from the shelf 41 of the upper frame through the open front 52 thereof and is placed upon the table top 50. When it is desired to move the display stand from place to place or at times when it is not being used, the display terminal or the like is returned to its stored position on shelf 41 within the upper frame 16 through the open front 52 thereof, and the display stand is lowered to the position of FIGS. 2 and 3.

What is claimed is:

1. A display stand comprising a base frame, an intermediate frame, means mounting said intermediate frame on said base frame for sliding movement bodily relative to said base frame in a vertical direction, an upper frame, means mounting said upper frame on said intermediate frame for sliding movement bodily relative to said intermediate frame in a vertical direction, means on said upper frame for supporting an appliance, means for bodily raising and lowering said intermediate frame relative to said base frame, and means for bodily raising said upper frame relative to said intermediate frame in response to raising of said intermediate frame and for bodily lowering said upper frame relative to said intermediate frame in response to lowering of said intermediate frame.

2. A display stand as defined in claim 1, wherein said supporting means on said upper frame comprises a table top.

3. A display stand as defined in claim 1, including wheels supporting said base frame for movement on a supporting surface.

4. A display stand comprising a base frame, an intermediate frame, means mounting said intermediate frame on said base frame for vertical sliding movement, an upper frame, means mounting said upper frame on said intermediate frame for vertical sliding movement, means on said upper frame for supporting an appliance, means for raising and lowering said intermediate frame relative to said base frame, and means for raising said upper frame relative to said intermediate frame in response to raising of said intermediate frame and for lowering said upper frame relative to said intermediate frame in response to lowering of said intermediate frame, said means for raising and lowering said intermediate frame comprising power means mounted on said base frame, a sheave mounted on said base frame above said power means, a flexible linear member extending over said sheave connected at one end to said intermediate frame and at the other end to said power means, and said means for raising and lowering said upper frame comprises a second sheave mounted on said intermediate frame and a second flexible linear member extending over said second sheave connected at one end to said upper frame and at the other end to said base frame.

5. A display stand comprising a base frame, an intermediate frame, means mounting said intermediate frame on said base frame for vertical sliding movement, an upper frame, means mounting said upper frame on said intermediate frame for vertical sliding movement, means on said upper frame for supporting an appliance, means for raising and lowering said intermediate frame relative to said base frame, and means for raising said upper frame relative to said intermediate frame in response to raising of said intermediate frame and for lowering said upper frame relative to said intermediate frame in response to lowering of said intermediate frame, said upper frame being telescoped within said intermediate frame and said intermediate frame being telescoped within said base frame.

6. A display stand comprising an upright base frame, wheels supporting said base frame for movement on a supporting surface, an intermediate frame telescoped within said base frame for vertical sliding movement from a lower position to an upper position extending above said base frame, an upper frame telescoped within said intermediate frame for vertical sliding movement from a lower position to an upper position extending above said intermediate frame, a table top on the top of said upper frame for supporting an appliance, means for raising and lowering said intermediate frame relative to said baser frame comprising power means mounted on said base frame, a pair of sheaves mounted in spaced apart relation on said base frame in positions spaced above said power means, a flexible linear member extending over each of said pair of sheaves and connected at one end to said intermediate frame and at the other end to said power means, and means for raising said upper frame relative to said intermediate frame in response to raising of said intermediate frame and for lowering said upper frame relative to said intermediate frame in response to lowering of said intermediate frame comprising a second pair of sheaves mounted in spaced apart relation on said intermediate frame, and a flexible linear member extending over each of said second pair of sheaves and connected at one end to said upper frame and at the other end to said base frame.

7. A display stand as defined in claim 6, wherein said intermediate frame in its lower position is telescoped substantially fully within said base frame, and said upper frame in its lower position is telescoped substantially fully within said intermediate frame with said table top substantially flush with the top of said intermediate and base frames.

8. A display stand as defined in claim 6, including a shelf within said upper frame for supporting and storing an appliance in the lower position of said upper frame.

* * * * *